United States Patent [19]
Lechner et al.

[11] Patent Number: 5,207,304
[45] Date of Patent: May 4, 1993

[54] INDUCTIVE ENERGIZATION SYSTEM AND METHOD FOR VEHICLES

[75] Inventors: Edward H. Lechner, Sunnyvale; Steven E. Shladover, Palo Alto; Khosrow Lashkari, Fremont; Daniel M. Empey, Palo Alto, all of Calif.

[73] Assignee: The Regents of the University of California, Oakland, Calif.

[21] Appl. No.: 801,743

[22] Filed: Dec. 3, 1991

[51] Int. Cl.⁵ .............................................. B60L 9/00
[52] U.S. Cl. ........................................ 191/10; 191/14
[58] Field of Search .................. 104/288, 300; 105/61; 191/10, 1 R, 4, 14–19

[56] References Cited

U.S. PATENT DOCUMENTS

| | | | |
|---|---|---|---|
| 2,589,453 | 3/1952 | Storsand | 104/288 X |
| 3,914,562 | 10/1975 | Bolger | 191/4 X |
| 4,007,817 | 2/1977 | Bolger, Jr. | 191/14 X |
| 4,092,554 | 5/1978 | Quinn | 191/10 X |
| 4,322,772 | 3/1982 | Fry | 104/288 X |
| 4,331,225 | 5/1982 | Bolger | 191/10 |
| 4,800,328 | 1/1989 | Bolger et al. | 191/4 X |

FOREIGN PATENT DOCUMENTS

| | | | |
|---|---|---|---|
| 0253345 | 1/1988 | European Pat. Off. | 191/10 |
| 0289868 | 11/1988 | European Pat. Off. | 191/10 |
| 2845438 | 4/1979 | Fed. Rep. of Germany | 191/10 |
| 7903237 | 10/1979 | Netherlands | 191/10 |

*Primary Examiner*—Joseph F. Peters, Jr.
*Assistant Examiner*—Scott L. Lowe
*Attorney, Agent, or Firm*—Flehr, Hohbach, Test, Albritton & Herbert

[57] ABSTRACT

An inductive energization system for moving vehicles includes wayside inductors under the roadway and pickup inductor circuits in electrically powered vehicles. A pickup power controller has a switching circuit, including a zero-crossing trigger circuit, a current limiting inductor, and a bleed resistor. The controller provides for fast switching, desirable for closed loop control of the inductive energy transfer system, as well as low harmonic distortion of waveforms, low acoustic noise, and low maintenance requirements. The pickup inductor of the preferred embodiment has rigid metal conductors bonded together into a single member, allowing this element to serve as both a current carrying element as well as a primary structural member of the pickup inductor. The roadway inductor is split into many segments. Sensors in the roadway detect when vehicles requiring power are present, and a wayside inductor segment controller responds to the sensory signals by energizing only those wayside inductor segments needed to transfer power to such vehicles. This control methodology improves the energy efficiency of the system. In addition, the roadway sensors can be designed to detect identification signals broadcast by vehicle identification transmitters, thereby enabling the system to charge for energy usage by each vehicle.

11 Claims, 4 Drawing Sheets

INDUCTIVE ENERGIZATION SYSTEM AND METHOD FOR VEHICLES

The present invention relates generally to systems and methods for inductive energization of vehicles, such as automobiles, busses and other wheeled vehicles, and particularly to the inductive energy transfer components used in such vehicles and in the corresponding power distribution systems.

BACKGROUND OF THE INVENTION

Referring to FIG. 1, an Inductive Energy Transfer System (IETS) 100 uses a magnetic field to transfer power across an air gap from a source inductor 102 to a pickup inductor 104. This system can be likened to an electrical transformer with the primary of the transformer being the source inductor and the secondary of the transformer being the pickup inductor. The primary inductor 102 is energized with an alternating current that creates a magnetic field that bridges the air (or other dielectric) gap 106 between the source (primary) inductor 102 and the pickup (secondary) inductor 104. This magnetic field induces a current in the winding of the pickup winding. The induced current is available as electric power on board a vehicle 110. This type of system allows energy to be transferred to vehicles with no physical contact between the vehicle and the wayside. The transferred energy can be used by an electrical motor 112 to provide motive power for the vehicle, charge an energy storage device 114 on board the vehicle or power auxiliary vehicle systems 116 such as HVAC, lighting systems, braking systems, controls and instrumentation.

Four basic elements are required to transfer power inductively: an AC power supply 120, a source inductor 102, a pickup inductor 104, and a controller 122 on board the vehicle to control the rate at which power is transferred to the vehicle 110. The AC power source 120 supplies current to the wayside source inductor 102. This current forms an alternating magnetic field in the air gap 106 between the wayside and pickup inductors. This field is captured by the pickup inductor 104 and induces a current in the pickup's conductors, which in turn provides electrical power to the vehicle's motor 112, battery 114, or auxiliary systems 116.

The AC power source 120 can be any AC source that can supply the required power to the wayside source inductor. The source inductor 102 consists of ferromagnetic inductor cores of the proper geometry and current carrying conductors called the primary winding. The primary winding may have various numbers of turns depending on the application.

The pickup inductor 104 is similar to the source inductor 102 but is mounted on the vehicle. The current carrying conductors of the pickup inductor are called the secondary winding and also may have various numbers of turns depending on the application. Controls 122 are required to control the power out of the pickup. This control can take the form of a resonant circuit of capacitors and the pickup. Capacitors of various values are placed in parallel with the pickup windings and solid-state switches are in series with each capacitor. Switching capacitance into or out of the circuit affects the resonant frequency of the circuit. The output current increases as the resonant frequency becomes closer to the driven (AC power) frequency. Inductive energy transfer systems for electrically powered vehicles have been the subject of previous U.S. Patents, including U.S. Pat. Nos. 3,914,562, 4,007,817, and 4,331,225, which are hereby incorporated by reference.

SUMMARY OF THE INVENTION

In summary, the present invention is an inductive energization system for moving vehicles, such as automobiles, busses and other wheeled vehicles. One aspect of the present invention is an improved controller for the pickup inductor circuit in the wheeled vehicle. The controller has a switching circuit, including a zero-crossing trigger circuit, a current limiting inductor, and a bleed resistor. This aspect of the present invention provides for fast switching, desirable for closed loop control of the inductive energy transfer system, as well as low harmonic distortion of waveforms, low acoustic noise, and low maintenance requirements.

A second aspect of the present invention concerns the pickup inductor mounted on board the vehicle. Minimizing pickup weight is important, as well as minimizing losses during operation. In the present invention the pickup inductor comprises rigid metal conductors bonded together into a single member, allowing this element to serve as both a current carrying element as well as a primary structural member of the pickup inductor.

In a third aspect of the present invention, the roadway inductor is split into many segments. Sensors in the roadway detect when vehicles requiring power are present, and a roadway segment energization controller responds to the sensory signals by energizing only the roadway segments needed to transfer power to such vehicles. This control methodology improves the energy efficiency of the system. In addition, the roadway sensors can be designed to detect identification signals broadcast by vehicle identification transmitters, thereby enabling the system to charge for energy usage by each vehicle.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Controller for Pickup Inductor Circuit

Figure 2:
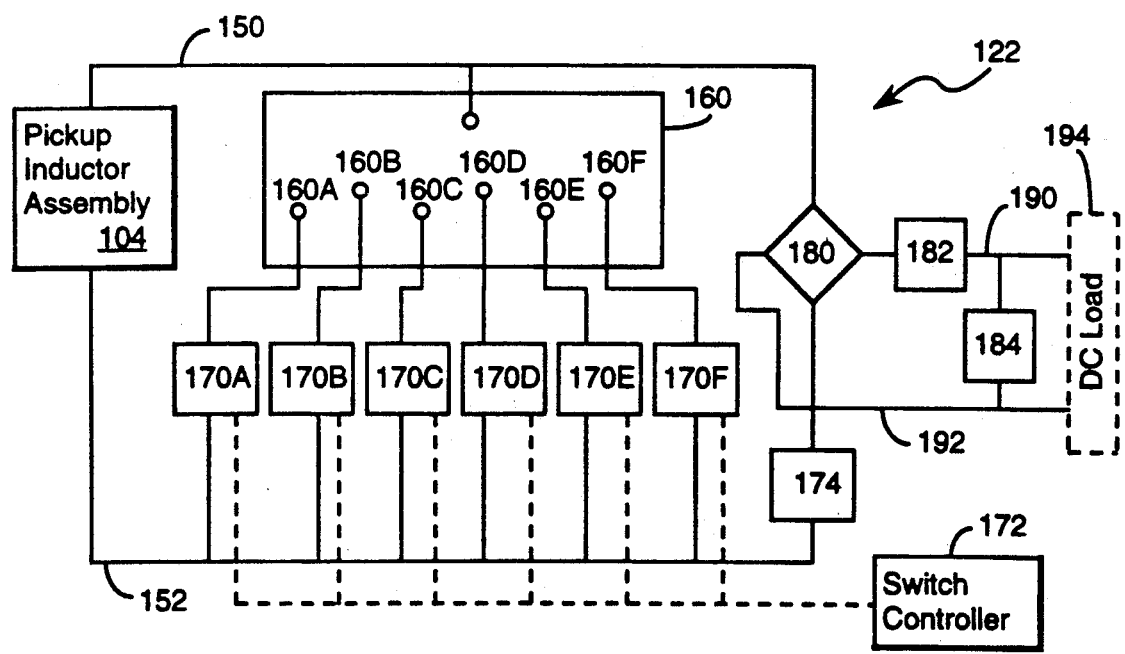
FIG. 2 schematically depicts the on board vehicle power pickup controller for controlling the inductive system output current.
Figure 3:
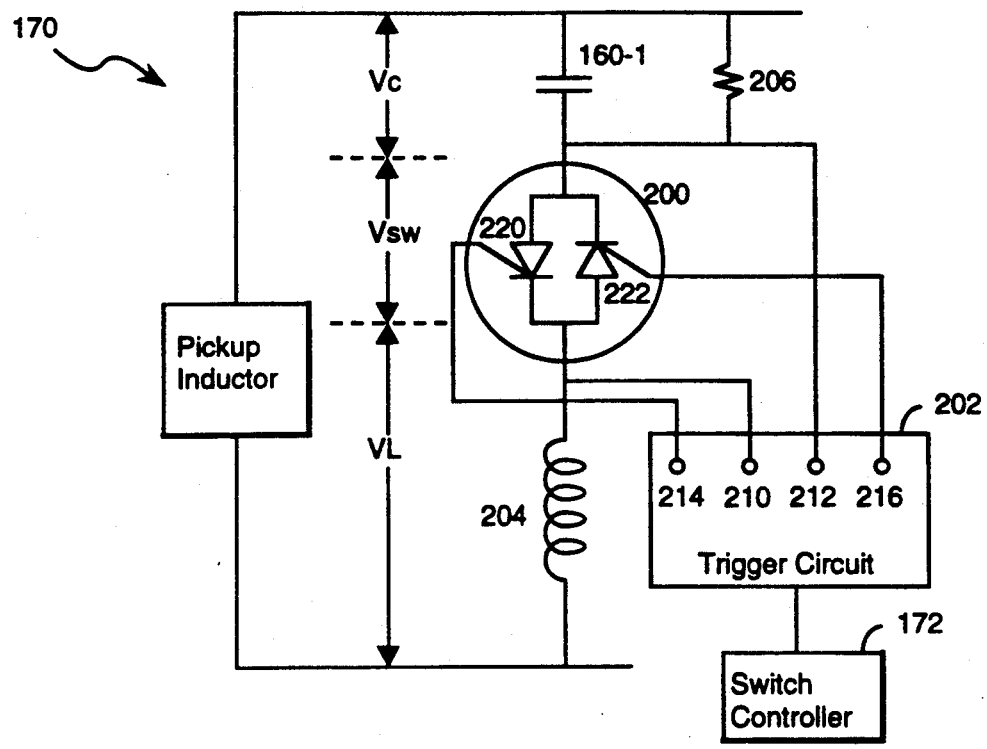
FIG. 3 shows a detailed schematic diagram of one capacitance switching branch of the power pickup controller of FIG. 2.

Referring to FIGS. 2 and 3, there is shown a controller 122 which regulates the transfer of power to the vehicle's motor, battery and auxiliary systems. The output current of such an inductive energy transfer system (or inductive coupling system) can be controlled by switching tuning capacitance into or out of the control circuit. Although this can be achieved with mechanical switches, there are numerous advantages to using solid state switches, including faster response, reduced noise, reduced maintenance, and other economic benefits.

The present invention uses special circuitry designed to trigger these switches when the applied voltage exactly equals the voltage on the capacitor (zero voltage across the switch) so as to prevent high current transients upon closure of the circuit. Such a transient could damage the switch or other components in the inductive coupling system as well as cause other adverse impacts. The solid state switches are controlled by gating signals that are timed to ensure that the switch is initially closed only when the voltage across the switch is very small, comparable to the voltage drop across the switch during normal operation, thereby preventing large transients in branch current.

Many solid state switches conduct from the time a gate signal is applied until the current drops to zero. When controlling current to a capacitive load, the moment that the switch stops conducting (zero current) corresponds to peak voltage on the capacitor. In the present invention, a bleed resistor is installed across the capacitor, which causes the voltage across the capacitor to discharge overtime. This is critically important, because if the capacitor remained at peak voltage, the applied voltage would not necessarily equal the capacitor voltage, and the switch would not always be able to turn on again when needed. Bleeding this voltage off is also desirable from a safety point of view. To maintain fast response of the control system, the capacitor voltage must bleed down to the applied voltage more quickly than would be required for safety purposes.

Another aspect of the invention is that small inductors are added in series with the solid state switches as a safety precaution. In the event of a failure of the trigger circuit, they limit the rate of rise in current to protect electrical equipment, primarily the solid state switches. Proper sizing of these inductors can also reduce harmonic content of voltage and current waveforms throughout the inductive coupling system.

Using non-uniform sizes of capacitance in the various parallel branches allows the number of control states to be much larger than the number of switches. If the capacitance values of all branches are equal, the number of control states equals the number of switches plus one. If the values of capacitance are exponentially spaced (i.e., a doubling in capacitance value from one branch to the next), the number of control states is two raised to the power equal to the number of switches, allowing much finer control of the inductive coupling system.

Referring to FIG. 2, current flows in from the pickup inductor 104 through leads 150 and 152. The tuning capacitor 160 has multiple taps, labeled 160A to 160F, and is thus essentially a set of parallel, selectable capacitors. The particular embodiment shown in FIG. 2 has six taps, although the number of taps will vary in accordance with the tuning control needed in any particular application of the invention. Using capacitors of non-uniform values allows more distinct values of total capacitance to be activated than using uniform branch capacitor values, for a given total number of switched branches. For instance in a setup with six switched branches and 62 microfarads of capacitance, using uniform capacitance values of 10.33 microfarads for each branch allows six control states, corresponding to 0, 10.33, 20.66, 31, 41.33, 51.66 and 62 microfarads. Using capacitance values of 1, 2, 4, 8, 16 and 31 microfarads gives the same total capacitance (62 microfarads) and the same total number of switches (six). The active capacitance can be any whole number of microfarads from 0 to 62. The number of control states is increased to 63, with a change from one control state to the next representing approximately 1.5% of the full output current range rather than 16.66% as in the example with six steps of 10.33 microfarads each. Output current can obviously be controlled much more accurately with this setup. The capacitance values do not have to be exponentially spaced as in the above example, although this does give the maximum number of control states for a given number of switches, and is the preferred embodiment.

Solid state switches, labeled 170A to 170F, connect the individual taps of capacitor 160 to the pickup terminal 152. Switch gating signals come from a switch controller 172, which can be either manual or automatic. The other end of each capacitor branch are connected together and to pickup terminal 150.

A compensation inductor 174 assists in the maintenance of sinusoidal waveforms in the AC portion of the circuit. A rectifier 180 converts AC to DC current. Ripples on the DC are filtered out by a filter inductor 182 and filter capacitor 184. The output of the on board controller 122 is clean DC current carried through leads 190 and 192 to the vehicle's motor, battery and auxiliary devices, here collectively called the DC load 194.

FIG. 3 shows the components of one switch 170. This circuit is repeated for each switchable branch of the capacitor 160. In addition to the capacitor 160-1 (which is a portion of the tuning capacitor 160 in FIG. 2) and a solid state switch 200, each branch of the switching mechanism has a trigger circuit 202, a current rate limiting inductor 204, and a bleed resistor 206. The trigger circuit 202 senses the voltage across the solid state switch 200 through leads 210 and 212. This voltage is labeled Vsw in FIG. 3. The trigger circuit 202 receives a branch selection signal from the switch controller 172. If this branch of the capacitance selection circuit is activate, the trigger circuit 202 generates gate signals for the solid state switch 200.

In the preferred embodiment, the solid state switch 200 is composed of two SCR's 220 and 222. Upon a command from the switch controller 172 to the trigger circuit 202 a gate signal is generated only when the voltage across the switch, Vsw, (as sensed by leads 210 and 212) crosses through zero, thereby preventing a large transient that would be created were this voltage large. The gate signals are transmitted to the switch through leads 214 and 216. The inductor 204 in series with the switch 200 limits the rate of rise of current through the switch 200 in the rare event that the trigger circuit 202 fails and the solid state switch is gated while the voltage across the switch is not zero (or very small). This inductor is in series with the tuning capacitor 160-1 being controlled by switch 200, and reduces the effective reactive impedance of the capacitor 160-1. The inductor is sized so that its reactive impedance is only approximately five percent (5%) of the capacitance in this particular branch, so the effect of the capacitor is only changed very slightly. Selecting this value of inductance also improves (reduces) the harmonic distortion within the circuit. The order of the switch 200 and inductor 204 can be reversed in the circuit 170.

The bleed resistor 206 is placed in parallel with the capacitor. This causes residual charge in the capacitor 160-1 to drain through the resistor. This resistance can be placed on a switch (not shown) so that it is only in the circuit when the solid state switch, 200, is open, preventing losses in the resistor when the capacitor is switched into the circuit.

Wayside Inductor

The wayside inductor is generally buried beneath the surface of the road and must withstand the forces imposed on it by vehicles driving over it. The cost of the wayside inductor is often a substantial fraction of the total system cost. Losses in the wayside inductor are often a substantial fraction of total system losses. For these reasons, it is important that the wayside inductor be of a rugged, low cost, and low loss design. The ideal geometry of the ferromagnetic metal cores of the wayside inductor is not well-suited to any existing manufacturing method.

Figure 4A:
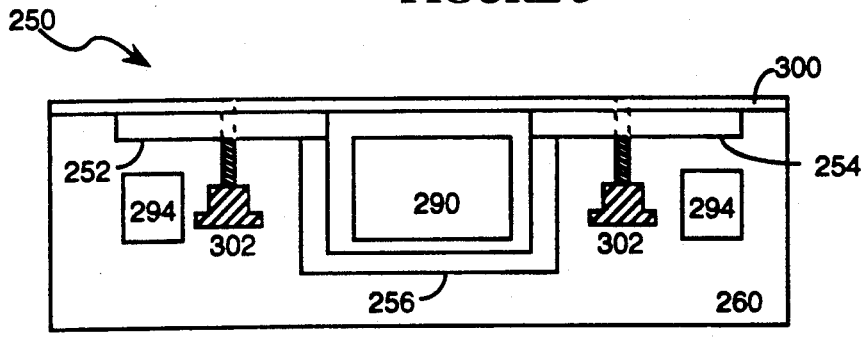
FIGS. 4A-4B show the general shape of the wayside inductor core for an inductive energy transfer system.
Figure 4B:
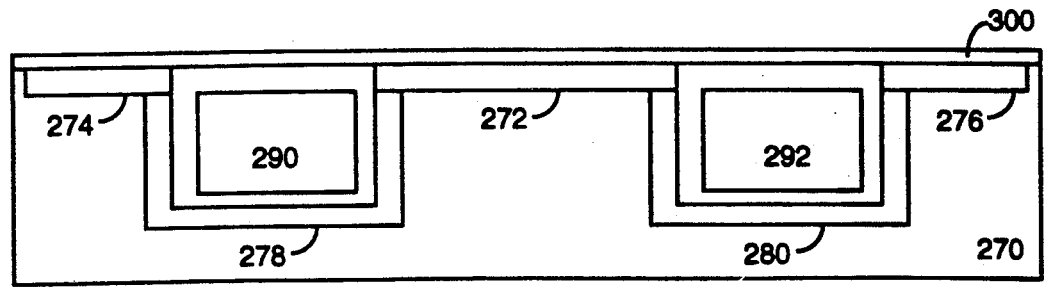

The wayside inductor can be implemented with either a single slot in the roadway inductor, referred to as a U-shaped design and shown in FIG. 4A, or with a double slot, referred to as a W-shaped design and shown in FIG. 4B. For both the U-shaped and W-shaped designs, the geometry of the cores are similar.

Referring to FIG. 4A, in the preferred embodiment, the wayside inductor cores 250 are assembled from three pieces 252, 254 and 256, each of which is a simple shape and readily manufactured with low losses and at low cost. These three pieces of the core are cast into a module 260 with appropriate fillers. This module is very durable and holds each of the three pieces of the core in its proper position. This three piece design is mechanically very solid and can be manufactured at lower cost and with lower losses than other designs.

In a conventional transformer, the cores are the minimum size required to accommodate the windings. For an inductive energy transfer system, the cores are widened as much as possible in the vicinity of the air gap to minimize the reluctance of the air gap. This results in an unusually shaped core, not suitable for manufacture by any existing mass production technique. A tape wound C-core 256 is placed in the center, with simple rectangular pieces 252 and 254 mounted on either side. When built of laminated ferromagnetic material, all pieces can be vacuum impregnated to enhance mechanical integrity and inhibit corrosion. All three pieces are cast into a single block of material (a module) which holds the pieces in their proper relative locations. These blocks or modules are manufactured to whatever length is most economical and appropriate for a particular installation, with larger modules often reducing the labor required for installation. The filler material in the modules 260 provides mechanical support for the core materials and transmits road loads to the road base structure. The modules can be sealed with epoxy, polyester, or a similar material to inhibit corrosion. This outer coating may be reinforced with fibers made of glass or another high strength material to increase mechanical integrity.

For designs employing a W-shaped design (two conductor slots rather than one), as shown in FIG. 4B, two three piece core groups can be placed side by side. If both sides of wayside inductor are placed within the same module 270, the two pole pieces in the center can be combined into a single pole piece 272, resulting in five pieces rather than six, namely two outer pole pieces 274 and 276, two C-cores 278 and 280, and one central pole piece 272. The C-cores are a well developed technology. There are many firms which manufacture these items, which are generally made using a tape-wound manufacturing method. The technology for manufacturing C-cores is mature and economical. Likewise, the pole pieces are a very simple geometry (rectangular) and can also be produced in large quantities very economically. Many companies manufacture these pieces as well. Finally, casting of the cores into a module is a relatively straight-forward task, with many companies able to perform this operation economically.

Figure 1:
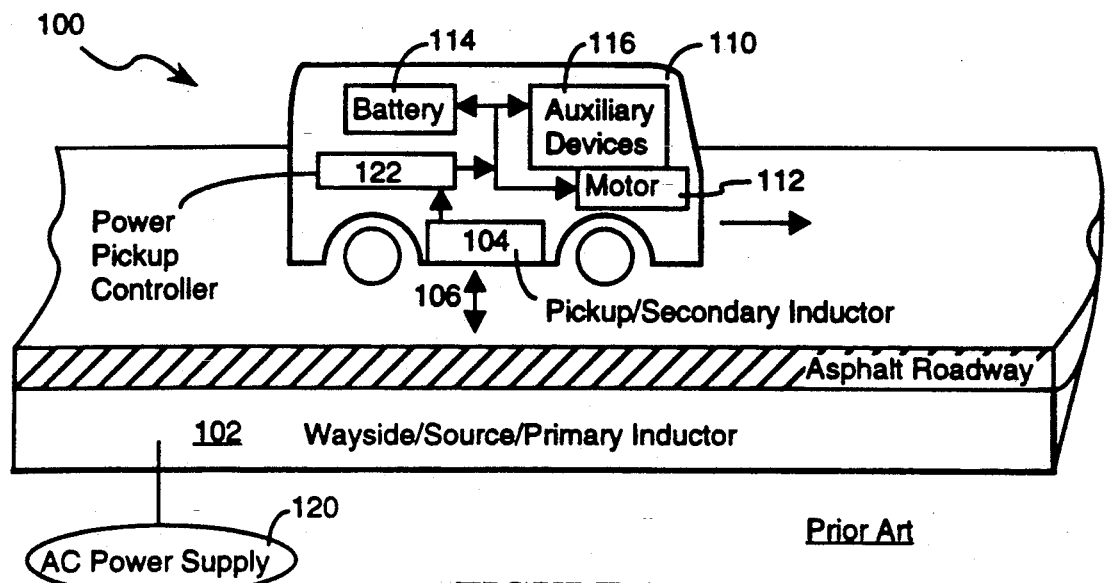
FIG. 1 is a block diagram of an inductive energization system for moving vehicles.

For either design, an alternating current (AC) is supplied to the wayside inductor winding. In the W-shaped design, the two sides of the inductor winding 290 and 292 form two opposite sides of a coil, with current flowing in opposite directions on the left 290 and right 292 sides of the inductor at any (every) instant in time. With the U-shaped design, the return conductors 294 must be placed somewhere. Two possible locations are near the outer edges of the wayside inductor core as shown as 294 in FIG. 4A, or in a parallel powered lane of roadway. The ferromagnetic wayside inductor core, 252-256-254 for the U-shaped design and 274-278-272-280-276 for the W-shaped design, forms part of a magnetic circuit and guides the magnetic flux to the pickup inductor. The magnetic field bridges the airgap (see FIG. 1) and continues through the pickup inductor core. The time rate of change of this flux induces a voltage in the pickup winding.

The magnetic flux which links both the wayside inductor coil and the pickup inductor coil, is called mutual flux. The mutual inductance between the two coils is proportional to this flux. The mutual flux is approximately proportional to the area of the air gap divided by its height. Maximizing this flux maximizes the mutual inductance and the ability to transfer energy to the vehicle. There are often practical mechanical requirements which limit the minimum size of the air gap between the wayside inductor core, 252-256-254 for the U-shaped design and 274-278-272-280-276 for the W-shaped design, and the pickup inductor core shown in FIG. 5B. To maximize the mutual inductance, the common area of the pickup and wayside cores is maximized. This dictates that the inductors be as wide as practically possible. Since the area occupied by the conductors 290 and 292 do not contribute to this common area, the pole face of the cores 252, 254 for the U-shaped design or 274, 272 and 276 for the W-shaped design is maximized.

The requirement for a large pole face area causes the ideal shape of the core cores to become very wide at the air gap. This results in a complicated core shape, and not well suited to highly automated manufacturing techniques. This is especially true considering the requirements for low losses in the system, presenting severe constraints on the materials which can be used for the cores. Cores are often fabricated from laminated electrical grade metals, often iron, nickel, etc. The magnetic material is used most efficiently when the magnetic flux density is uniform within all material within the core. Since the total magnetic flux within the core decreases further from the conductor slots, tapering the cores results in the most efficient use of the material. On board the vehicle where weight is an important consideration, tapered cores are very effective. For the wayside inductor, where weight is much less significant, it is most important to minimize cost and maximize mechanical integrity of the core. This is accomplished by using three pieces for the core (as shown in FIGS. 4A and 4B), each of which is a simple shape and easy to manufacture. Even though the magnetic material is not used as efficiently as with a tapered core and more core material is used, the total cost is substantially reduced due to reduced tooling and labor costs in manufacture and assembly of the total core assembly.

When the core pieces described above are assembled into a module, these pieces are cast into a filler material, forming a solid block. The pole pieces are held in the proper position relative to each other with very small gaps during casting. This can be accomplished via any of several methods, including gluing, clamping, or magnetic forces. Once the casting material has hardened, the cores are held in their proper places for the life of the module, expected to be at least 25 years. The gaps between the core pieces are not of any serious consequence as long as they are small because the magnetic circuit has a large reluctance anyway, due to the air gap between the wayside and pickup cores. The areas where the core pieces would be exposed are covered with a thin protective coating 300. This can be a material such as epoxy, polyester, etc. Reinforcing with a strong fibrous material such as glass increases the strength and durability of the protective coating. The conductor slot 290 may be left open during manufacture of the module allowing subsequent installation of conductors prior to or after arrival on the installation site.

The modules are manufactured to whatever length is most economical, considering expenses associated with both the manufacture as well as installation of the modules. Conduits can be left for additional conductors if required.

As shown in FIG. 4A, the wayside inductor module 260 preferably includes inserts 302 allowing the module to be supported from above. These inserts 302 may consist of any of a number of commercially available inserts including but not limited to threaded inserts and pins. These inserts allow the module to be lifted from above, easing installation in the roadway. The inserts can also be used to support the module while it is being cast into the road surface. Supporting the module from above eases installation considerable, as adjustments to the modules position can be made readily and accurately at any time during the installation process. Specifically, tolerances of any work required in the preparation of the roadbed for the inductor modules can be relatively low, as the module cores can be accurately positioned during installation of the module.

Pickup Inductor

The pickup inductor is mounted on board the vehicle, hence minimizing pickup weight is important, as well as minimizing losses during operation. The pickup conductors can be cables, although the use of solid conductors has many advantages. Specifically, in accordance with the present invention, the rigid conductors can be bonded into a single composite element, which can serve as a structural element as well as a current carrying member. Furthermore, tubular sections can be used, saving additional weight on board the vehicle. Inductive energy transfer systems often function better at frequencies higher than standard power frequencies (50 or 60 Hz). At higher frequencies, skin effect can become significant. Tubular conductors are affected by skin effect much less than comparably sized solid conductors, resulting in a better weight to resistance ratio than solid conductors. When rectangular bars are used as conductors, skin effect is reduced by using high aspect ratio bars rather than square ones. Due to proximity effects and leakage flux, rectangular bars should be oriented so that their long dimension is perpendicular to the magnetic flux in the air gap of the inductive coupling system, which minimizes losses for a given conductor size.

Figure 5A:
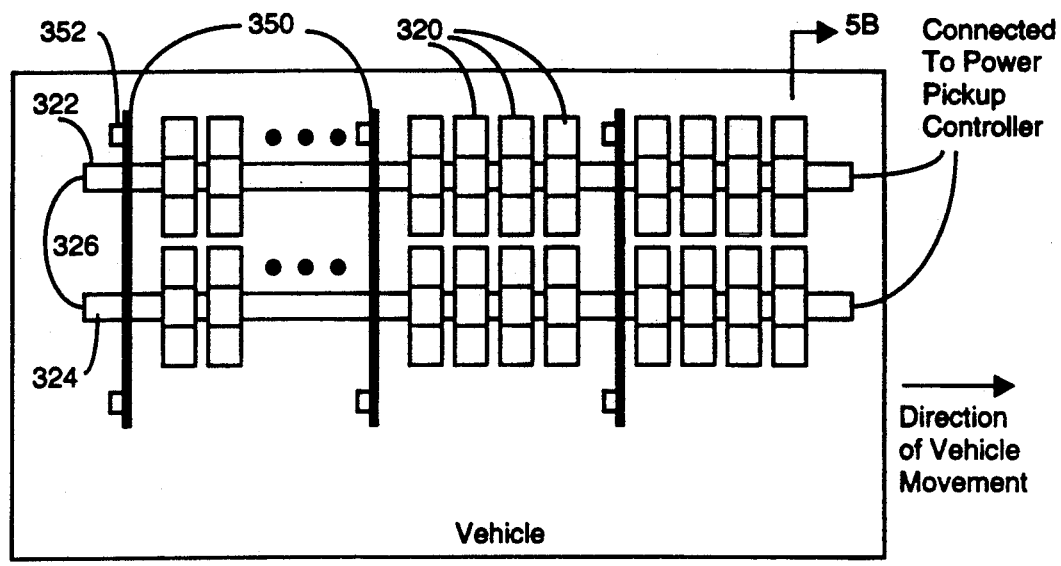
FIG. 5A-5D depict preferred embodiments of the pickup inductor.

FIG. 5A shows a plan view of the pickup inductor of the preferred embodiment. As with any transformer, the pickup consists of both magnetic and electrical circuits. Ferromagnetic cores 320 form the magnetic circuit while electrical conductors 322 and 324 can take the form of cables or metallic bars, generally made of copper or aluminum. In addition to the ferromagnetic cores and conductors, the pickup contains mechanical elements to hold the pickup together, provide mechanical protection, etc. The quantity and mass of these additional parts, frame elements, brackets, etc can be minimized by using the conductor packs as the longitudinal beams of the pickup.

Figure 5B:
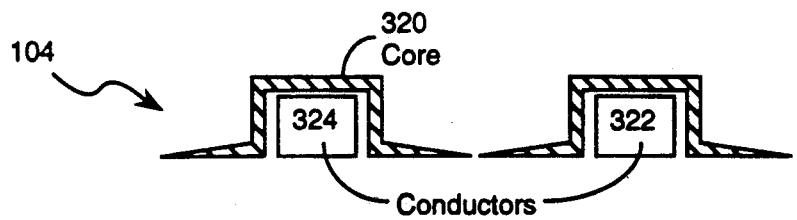

As shown in FIGS. 5A and 5B, a W-shaped design cross section is formed by placing two U-design inductors side by side. In the preferred embodiment, the pickup cores 320 are supported on the conductor packs 322 and 324. The conductor packs are made of highly conductive metal, typically aluminum or copper. The two conductor packs are electrically connected by cables 326.

Figure 5C:
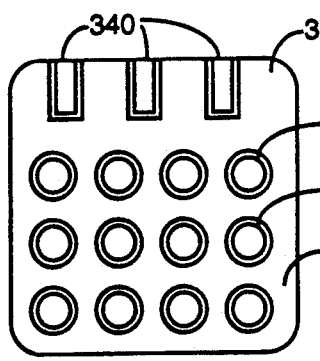
Figure 5D:
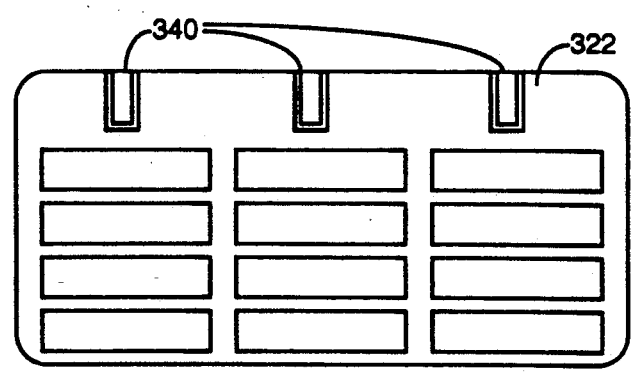

FIGS. 5C and 5D show cross sectional views of two embodiments of conductor pack 322. In each design the conductors 330 are bonded together forming a composite structure. The conductors are bonded with a fiberglass reinforced epoxy or similar material 332. This provides insulation between conductors as well as providing mechanical strength. Conductor shape and overall size and shape of the conductor pack can vary from one application to another. In FIG. 5C, the conductors are round tubes and the overall conductor pack is nearly square, while in FIG. 5D they are rectangular bars, and the overall conductor pack is approximately three times as wide as it is high.

Inserts 340 can be placed in the conductor pack, easing installation and assembly of the pickup inductor. Inserts are made of a non-ferromagnetic material.

Lateral cross beams 350 in FIG. 5A, may be added to the basic structure formed by the conductor packs 322, 324, both for structural support and also for connecting the pickup inductor assembly to the vehicle's frame. The weight of the pickup inductor assembly can be transferred to the vehicle's frame via either the inserts 340 in the conductor packs or the cross beams 350, depending on the geometric constraints of the vehicle. Attachment brackets 352 on the cross beams are provided for connecting the pickup inductor assembly to the vehicle's frame.

Segmented Wayside Inductor

Figure 6:
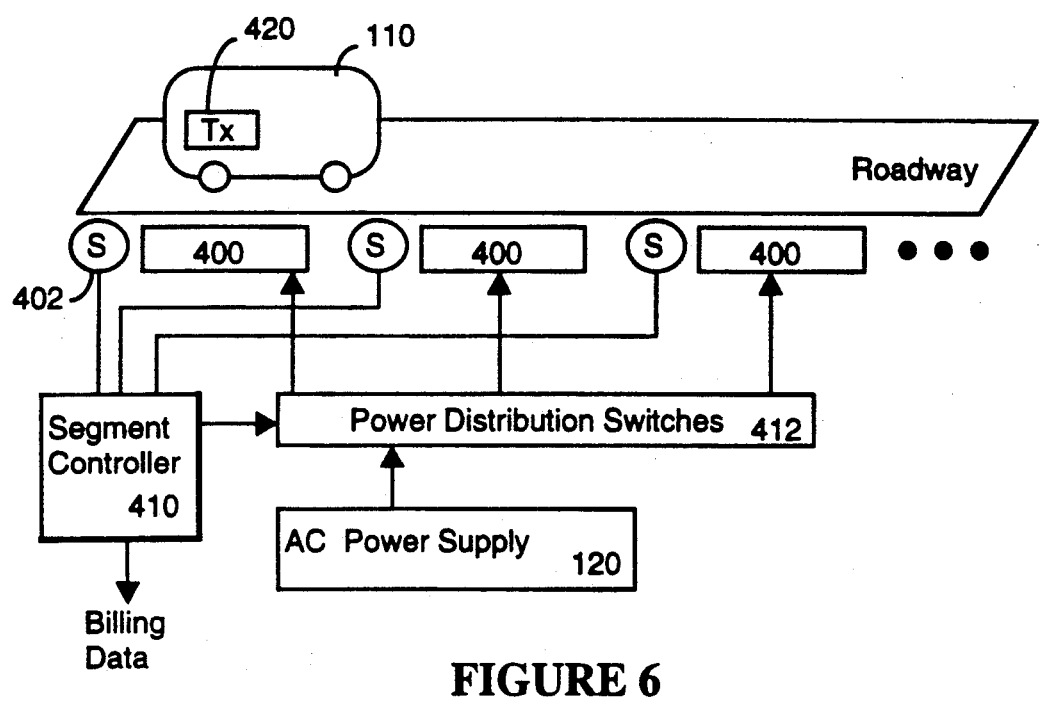
FIG. 6 shows a small portion of an inductive energy transfer system, split into segments.

Referring to FIG. 6, in the preferred embodiment the roadway inductor is split into many segments 400. Sensors 402 in or near the roadway detect when vehicles 110 requiring power are present. A controller 410 responds to the sensory signals by energizing only the wayside inductor segments needed to transfer power to such vehicles. In particular, the controller 410 sends control signals to a set of power distribution switches 412. Each power distribution switch energizes the corresponding wayside inductor segment 400 only when enabled by the control signals. This control methodology improves the energy efficiency of the system. In addition, the roadway sensors can be designed to detect identification signals from a vehicle identification system, thereby enabling the system to charge for energy usage by each vehicle.

When system utilization is low to moderate (e.g., fewer vehicles than segments operational) switching unoccupied segments off results in a decrease in system losses without reducing the energy delivered to vehicles. This raises system efficiency. The detection system (sensors 402 and controller 410) determines when any given segment should be energized. Specifically it must determine whether or not a vehicle is present on each segment and also whether or not the vehicle intends to draw energy from the roadway and if it is so authorized. The power switching system 412 energizes segments of the roadway inductor as required and determined by the detection system.

In the preferred embodiment, each vehicle 110 equipped to draw energy from the wayside inductor segments is also equipped with a vehicle identification transmitter 420 that communicates (e.g., transmits, at a predefined carrier frequency) a unique identification code for each such vehicle. Each sensor 402 includes both a magnetic sensor that detects the presence of a vehicle (which may or may not be a vehicle equipped to draw power from the wayside inductor segments) and an vehicle identification sensor that determines whether a vehicle equipped to draw power from the wayside inductor segments. The sensor signals from each sensor 402 are used by controller 410 to energize the neighboring segment(s) 400. In addition, the vehicle identification codes can be used for billing purposes.

It is noted that there are a number of alternate vehicle identification technologies which could be used to identify vehicles equipped to draw power from the wayside inductor segments.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A power pickup system for an electrically powered vehicle, comprising:
   a pickup inductor connected to first and second nodes;
   a power receiving circuit coupled to said first and second nodes;
   a multiplicity of tuning capacitors;
   branch selection means for selecting ones of said multiplicity of tuning capacitors to be coupled to said first and second nodes and for generating a selected signal for each selected tuning capacitor; and
   a multiplicity of switching circuits, each switching circuit selectively coupling a corresponding tuning capacitor to said first and second nodes;
   each switching circuit including
      a solid state switch, and
      a trigger circuit coupled to said branch selection means and said solid state switch, said trigger circuit sensing the voltage across said solid state switch and, after receiving one said selection signal from said branch selection means that corresponds to said switching circuit, triggering closure of said solid state switch when said sensed voltage across said solid state switch is approximately zero.

2. The power pickup system of claim 1, wherein each said switching circuit further includes a resistor connected across said corresponding tuning capacitor, said resistor bleeding voltage from said capacitor at a predetermined rate.

3. The power pickup system of claim 1, each switching circuit including an inductor connected in series with said solid state switch to protect said solid state switch from high frequency current fluctuations.

4. The power pickup system of claim 1, said trigger circuit generating a gating signal that becomes enabled and closes said solid state switch when said sensed voltage across said solid state switch is approximately zero.

5. The power pickup system of claim 1, said power pickup inductor including:
   at least one horizontal support beam having a main horizontal axis and electrical conductors running parallel to said horizontal axis; wherein said first and second nodes are connected to predefined ends of said electrical conductors; and
   a multiplicity of U-shaped inductive pickup cores mounted on each said horizontal support beam;
   whereby said horizontal support beams provide structural support to said power pickup inductor as well as providing electrical conductors.

6. The power pickup system of claim 1, further including
   roadway inductors implanted in a roadway;
   each roadway inductor including a U-shaped core, two pole pieces connected to opposite ends of said U-shaped core and extending away from each other, and inductor windings running through said U-shaped core's throat, substantially parallel to a transverse axis of said U-shaped core.

7. The power pickup system of claim 6, wherein each roadway inductor comprises a module in which said U-shaped core, pole pieces and inductor windings are held in fixed positions by non-conductive filler material.

8. The power pickup system of claim 1, further including
   roadway inductors implanted in a roadway; each roadway inductor including:
   a U-shaped core having two generally vertical sides each having an upper and lower end, a generally horizontal side connecting the lower ends of said two generally vertical sides;
   two generally horizontal pole pieces connected to the upper ends of said generally vertical sides and extending away from each other; and
   inductor windings running substantially parallel to a transverse axis of said U-shaped core and partially surrounded by the sides of said U-shaped core.

9. The power pickup system of claim 8, wherein each roadway inductor comprises a module in which said U-shaped core, pole pieces and inductor windings are held in fixed positions by non-conductive filler material.

10. The power pickup system of claim 1, further including
   roadway inductors implanted in a roadway;
   each roadway inductor including a pair of spaced apart U-shaped cores having substantially parallel transverse axes and openings positioned near the roadway's surface, a first separately formed pole piece spanning the space between the pair of U-shaped cores and connected to a first end of each of the pair of spaced apart U-shaped cores, second and third separately formed pole pieces connected to distal ends of the pair of U-shaped cores and extending away from the space between the pair of U-shaped cores, and inductor windings running substantially parallel to the transverse axes of said pair of U-shaped cores with each inductor winding being partially surrounded by one of said pair of U-shaped cores.

11. The power pickup system of claim 10, wherein each roadway inductor comprises a module in which said pair of U-shaped cores, pole pieces and inductor windings are held in fixed positions by non-conductive filler material.

* * * * *